Oct. 15, 1940.  T. M. RECTOR ET AL  2,217,815
TREATMENT OF NUTS
Filed Sept. 10, 1938
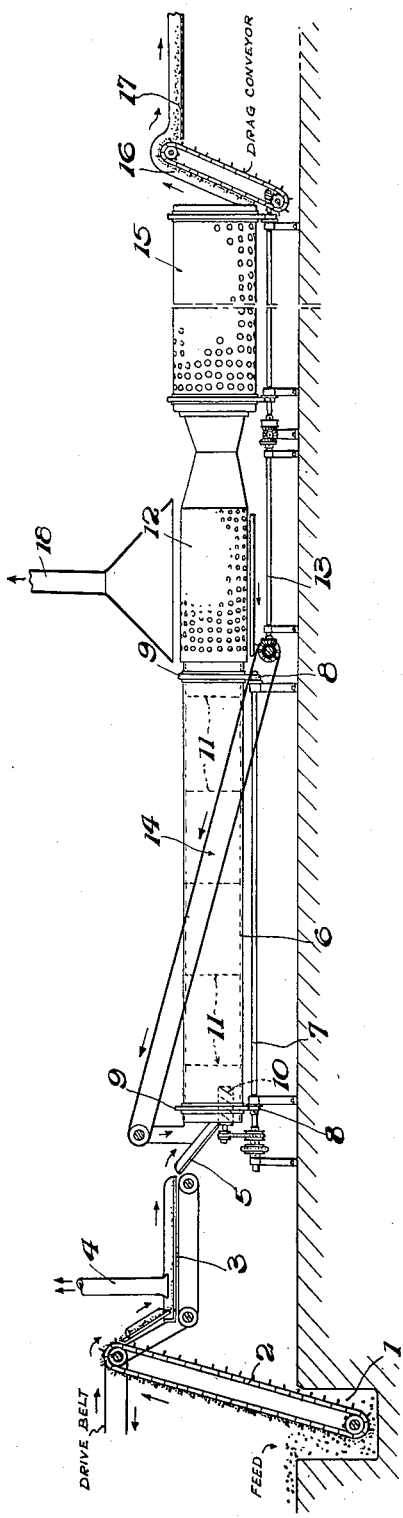
Inventors
Thomas M. Rector,
Arthur F. Stagmeier.
By Cameron, Kerkam + Sutton.
Attorneys Patented Oct. 15, 1940

2,217,815

UNITED STATES PATENT OFFICE 2,217,815

TREATMENT OF NUTS

Thomas M. Rector, Morristown, and Arthur F. Stagmeier, Upper Montclair, N. J., assignors to General Foods Corporation, New York, N. Y., a corporation of Delaware Application September 10, 1938, Serial No. 229,380

13 Claims. (Cl. 99—148)

This invention relates to the treatment of nuts and has particular reference to the treatment of nuts in the shell to improve their appearance and keeping qualities.

Most nuts, as shipped in bulk in ordinary commerce, are not especially pleasing to the eye, and Brazil nuts, by reason of the conditions under which they are customarily harvested, are among the worst in this respect. They usually are received in a very dusty and dirty condition, and when dried out they acquire a flat unattractive appearance and have a tendency to become moldy. It accordingly has been proposed, as an aid to marketability, that nuts be coated after cleaning with a dry powdered pigment by tumbling them in a barrel containing a quantity of dry coloring matter. Another expedient which has been suggested is that the nuts be polished with a suitable colored wax. Neither of these methods has met with much success for the reason that dry pigment does not adhere to the shells and consequently results in dusty nuts, and colored wax produces a hard, glossy finish which is unnatural and artificial. Still another procedure, one which has been used to a considerable extent in recent years, is a so-called "wet process" in which the nuts are given a suitable color by being dipped in an appropriate dye solution and then dried. This has the advantage of giving the nuts a permanent dull finish of the desired shade, but unless the nuts are properly dried, mold is apt to develop. The procedure also is expensive and time consuming.

It accordingly is one of the objects of the present invention to provide nuts in the shell with a protective coating against deterioration and at the same time give the nuts a clean, attractive, and uniform appearance with a natural dull finish.

Another object is to coat nuts with a protective layer such as wax and a film or layer of particles of finely ground coloring matter adhering to the protective layer.

A further object is to improve the keeping quality and appearance of nuts as indicated above in a continuous operation which is relatively inexpensive but effective in securing the desired ends in large scale production.

Generally stated, a process embodying the present invention comprises agitating the nuts in contact with a mixture of relatively small particles of a suitable waxy material, particles of finely divided pigment, and particles of a rubbing material of the character of sawdust, which assists in transferring the wax to the shells of the nuts.

The agitation of the nuts in the presence of this mixture removes any remaining dirt and dust from them and applies a coating of wax to the shells which picks up and retains particles of the pigment. Thus the coating of wax serves the dual function of a protective coating which prevents drying out of the nuts and development of mold, and of a carrier or binder for the pigment particles. By suitably selecting the pigment, the resulting nuts can be made to have a natural color, and as the wax is charged with pigment and not polished, their appearance is not shiny or artificial but dull and natural.

The process is well adapted for practice in a continuous manner by establishing in any suitable way a zone of agitation of the nuts in contact with the treating mixture, and then continuously separating and discharging the treated nuts by appropriate means while continuously recycling the treating mixture to the inlet of the agitation zone together with a fresh supply of nuts. In practicing a continuous process of this character, the mixture in which the nuts are to be agitated is made up and supplied to the apparatus in any suitable manner. For example, a mixture which gives good results with Brazil nuts, which are referred to merely as an illustration of the invention, consists of sawdust, wax in the proportion of 10% to 20% by weight of the sawdust, and pigment in the proportion of about 2% to 4% of the sawdust. The wax may be used in the form of small particles or beads of wax or waxy material of any suitable type mixed with the sawdust or a part or all of it may be melted and incorporated in a portion of the sawdust, by spraying or otherwise, to provide sawdust particles impregnated with wax. The finely divided pigment preferably is merely mixed with the wax and sawdust particles, the color being subject to variation as desired. A color which has been found suitable in treating Brazil nuts, for instance, consists of a mixture of substantially equal parts of yellow and red pigments such as iron oxides.

Other materials besides sawdust may be used as the rubbing or transfer agent in the process, and when properly proportioned give comparative results. As examples, may be mentioned ground cork, shredded excelsior, and shredded shavings. Generally, however, sawdust, and especially hardwood sawdust, will be found less expensive and more resistant to breaking up into fine dust as a result of the agitation of the nuts therewith. Also, mixtures in which the wax has been impregnated upon a portion of the sawdust, excelsior, or shavings are preferable to those containing free particles of wax, in that they enable a smoother coating to be obtained and ensure a more even distribution of wax and pigment.

A suitable apparatus for practicing a continuous process of the character described is illustrated diagrammatically in the accompanying drawing, but it is to be expressly understood that such drawing and the particular procedure described in connection therewith are for purposes of illustration only and are not to be taken as defining the limits of the invention.

Referring to the drawing, the nuts to be treated are deposited in a bin or receptacle 1, from which they are transferred as by a drag conveyor 2 to a picking table 3. A suitable suction hood 4 may be mounted above this table to remove empty nuts, dirt, and pieces of shell. From the picking table, which may comprise a conveyor of any suitable type, the nuts pass down a chute 5 into the inlet end of an agitating or tumbling cylinder 6 which may be rotated in any suitable manner as by a drive shaft 7, and gears 8 and 9 on the shaft and cylinder, respectively. An initial charge of the treating mixture is loaded into the cylinder in any suitable manner. The inlet end of the cylinder is properly provided for a short distance with a suitable screw or spiral conveyor 10, to advance the nuts into the cylinder and prevent their piling up about the entrance. The length and speed of rotation of the cylinder should be such as to provide the proper time of treatment of the nuts, which may vary under different conditions and with different types of nuts. If desired, suitable retarding baffles 11 may be provided in the cylinder to prevent too rapid advance of the nuts.

After passing through the cylinder 6, the nuts together with the treating mixture pass into a screening cylinder or sieve 12 provided with openings that are too small to permit escape of the nuts but through which the mixture of sawdust, wax, and pigment is discharged onto a suitable conveyor 13. Preferably, a suction hood 18 is provided for the screening cylinder to draw off the dust and fines produced as a result of the breaking up of the sawdust in the agitating cylinder. The mixture thus discharged through the holes in cylinder 12 is returned to the inlet end of the cylinder 6 in any suitable manner as by the inclined conveyor 14, which delivers the mixture to the feed chute 5. The supply of pigment, sawdust, and wax or wax impregnated sawdust can be replenished as required, for example, by adding the necessary amounts to the mixture passing up the conveyor 14. From the screening cylinder 12, the treated nuts are preferably passed to a suitable grading cylinder 15, in which small and immature nuts are separated out by dropping through appropriately sized holes in the cylinder wall, and the remainder are delivered by a conveyor 16 to an inspection table 17. On the inspection table, the nuts are examined for soundness and quality and those approved are then collected for packing and storage.

The initial volume of the treating mixture in the cylinder 6 and the rate at which additional material is added are governed by the quantity and kind of nuts treated. Thus in an installation adapted to treat four and one-half tons of Brazil nuts per hour and having an agitating cylinder approximately forty feet long rotating at a speed giving a treatment period of about 10–12 minutes, the initial charge may appropriately comprise 200 pounds of plain sawdust, 200 pounds of impregnated sawdust containing 35% wax, and 10 pounds of pigment, when impregnated sawdust is used as the waxy material, or 400 pounds of plain sawdust, 40 pounds of wax beads, and 10 pounds of pigment, when free wax is used. In each instance, it is desirable that this charge be replenished during the treatment, a suitable rate being about 2 pounds of pigment and either 1 pound of impregnated sawdust or 2 pounds of wax beads per 1,000 pounds of nuts passed through the cylinder.

From the foregoing description, it is apparent that during their passage through the treating cylinder the nuts are cleaned and coated with wax from the impregnated sawdust, the volume of plain sawdust acting as a rubbing or transferring agent and spreading the wax in an even film over the surface of the nuts. As the wax is thus transferred to the nuts, they pick up pigment from the mixture, and since there is no polishing action and there is always free pigment in the mixture, the resulting coating has a dull, colored finish instead of a bright shiny one. This gives the nuts a natural, attractive appearance and renders them more acceptable to the trade. At the same time the coating seals the pores of the shells, preventing changes in the moisture content of the nuts, inhibits the development of mold, and being dry, enables the nuts to be bagged immediately. Furthermore, the treatment permits practically a complete separation of good and bad nuts to be made. Unsound nuts having a slightly oily surface which is difficult to detect by the eye or touch, pick up pigment but not wax during the treatment and acquire a dark, damp appearance as a result which readily distinguishes them from good nuts as they pass over the final inspection table. Besides improving the appearance of nuts and protecting them against change, the coating is therefore also a mark of quality.

Although the invention has been illustrated and described in connection with one embodiment thereof, and mention has been made of Brazil nuts, it will be understood that the invention is not limited to the particular process and apparatus described and illustrated nor to the treatment of Brazil nuts alone. Variations may be made in the procedure as well as in the composition of the mixture with which the nuts are treated, as will be apparent to those skilled in the art, and the treatment is applicable to all nuts whose customary shell appearance it is desired to change. Reference accordingly is to be had to the appended claims for a definition of the limits and scope of the invention.

What is claimed is:

1. A process of treating nuts in the shell which comprises agitating them in contact with a mixture of particles of a waxy material, finely divided pigment, and articles of a non-waxy rubbing agent, whereby said nuts are coated with a film of wax having particles of said pigment adhering thereto.

2. A continuous process of treating nuts in the shell which comprises establishing a zone of agitation, continuously feeding nuts thereto and agitating them therein in contact with a mixture of particles of a waxy material, finely divided pigment, and particles of a non-waxy rubbing agent, continuously separating said nuts from said mixture after said agitation, and continuously returning said separated mixture to said zone.

3. A process of treating nuts in the shell which comprises agitating them in contact with a mixture of particles of a wax impregnated material, finely divided pigment, and particles of a non-waxy rubbing agent, whereby said nuts are coated with a film of wax having particles of said pigment adhering thereto, and separating said coated nuts from said mixture.

4. A process of treating nuts in the shell which comprises agitating them in contact with a mixture of particles of a wax impregnated material, finely divided pigment, and sawdust, whereby said nuts are coated with a film of wax having particles of said pigment adhering thereto.

5. A continuous process of treating nuts in the shell which comprises continuously feeding said nuts and a mixture of particles of a wax impregnated material, finely divided pigment, and particles of a non-waxy rubbing agent to a zone of agitation, continuously agitating said nuts and mixture therein to coat said nuts with a film of wax having particles of said pigment adhering thereto, continuously separating said coated nuts from said mixture, and continuously returning said separated mixture to said zone.

6. A continuous process of treating nuts in the shell which comprises continuously feeding said nuts and a mixture of particles of a waxy material, finely divided pigment, and sawdust to a zone of agitation, agitating said nuts and mixture therein to clean and coat said nuts with a film of wax having particles of said pigment adhering thereto, continuously separating said coated nuts from said mixture, and continuously returning said separated mixture to said zone.

7. A process of treating nuts in the shell which comprises mixing them with wax impregnated sawdust, raw sawdust and finely divided pigment, and agitating said mixture to coat said nuts with a film of wax having particles of said pigment imbedded therein and adhering thereto.

8. A process of treating nuts in the shell which comprises mixing them with particles of a waxy material, finely divided pigment, and sawdust, and agitating said mixture to clean and coat said nuts with a film of wax having particles of said pigment adhering thereto.

9. A process of treating nuts in the shell which comprises mixing them with wax impregnated sawdust, finely divided pigment, and particles of a non-waxy rubbing agent, agitating said mixture to coat said nuts with a film of wax having particles of said pigment adhering thereto, and separating said coated nuts from said mixture.

10. A continuous process of treating nuts in the shell which comprises continuously feeding said nuts and a mixture of wax impregnated sawdust, raw sawdust, and finely divided pigment to a zone of agitation, continuously agitating said nuts and mixture therein to coat said nuts with a film of wax having particles of said pigment adhering thereto, continuously separating said coated nuts from said mixture, and continuously returning said separated mixture to said zone.

11. A continuous process of treating nuts in the shell which comprises continuously feeding said nuts and a mixture of wax impregnated sawdust, raw sawdust, and finely divided pigment to a zone of agitation, continuously agitating said nuts and mixture therein to coat said nuts with a film of wax having particles of said pigment adhering thereto, continuously separating said coated nuts from said mixture, supplementing said mixture by additions of wax impregnated sawdust and pigment, and continuously returning said supplemented mixture to said zone.

12. A continuous process of treating nuts in the shell which comprises continuously mixing said nuts with wax impregnated sawdust, raw sawdust, and finely divided pigment, continuously agitating said mixture to coat said nuts with a film of wax having particles of said pigment adhering thereto, and continuously separating said coated nuts and recycling said mixture of wax impregnated sawdust, raw sawdust, and pigment.

13. A process of treating nuts in the shell which comprises mixing them with equal parts of wax impregnated and raw sawdust and a lesser proportion of finely divided iron oxides, and agitating said mixture to coat said nuts with a film of wax having particles of said oxides imbedded in and adhering to substantially the entire surface thereof.

THOMAS M. RECTOR.
ARTHUR F. STAGMEIER.